United States Patent [19]
Strock et al.

[11] Patent Number: 5,928,615
[45] Date of Patent: Jul. 27, 1999

[54] WET SCRUBBER OXIDATION AIR SPARGER ARRANGEMENT

[75] Inventors: Thomas Wayne Strock, Canton; Wadie Fawzy Gohara, Barberton, both of Ohio

[73] Assignee: McDermott Technology, Inc., New Orleans, La.

[21] Appl. No.: 08/679,495

[22] Filed: Jul. 12, 1996

[51] Int. Cl.⁶ .................................................. B01D 47/06
[52] U.S. Cl. ........................ 422/231; 422/224; 422/168; 422/171; 261/124
[58] Field of Search .................................. 422/168, 169, 422/172, 171, 231, 224; 423/243.03, 242.1, 555, 243.08; 261/121.1, 124

[56] References Cited

U.S. PATENT DOCUMENTS

| | | | |
|---|---|---|---|
| 2,702,786 | 2/1955 | Hakes | 261/124 |
| 2,854,827 | 10/1958 | Lockerbie et al. | 261/124 |
| 3,243,169 | 3/1966 | Caudle et al. | 261/124 |
| 3,785,779 | 1/1974 | Li et al. | 261/124 |
| 4,138,970 | 2/1979 | Harmon | 261/124 |
| 5,013,493 | 5/1991 | Tharp | 261/124 |
| 5,494,614 | 2/1996 | Gohara et al. | 261/124 |
| 5,569,434 | 10/1996 | Devanathan et al. | 422/231 |

*Primary Examiner*—Hien Tran
*Attorney, Agent, or Firm*—Robert J. Edwards; D. Neil LaHaye

[57] ABSTRACT

An air sparger assembly for a flue gas desulfurization wet scrubber agitation tank that eliminates the need for a mixer and reduces the amount of piping required. The air sparge pipes are arranged to be concentric with the agitation tank. A single main header provides air to the air sparge pipes. The discrete location of the air discharge holes in the sparge pipes utilizes the buoyant energy of the oxidation air to mix the slurry in the agitation tank.

2 Claims, 3 Drawing Sheets

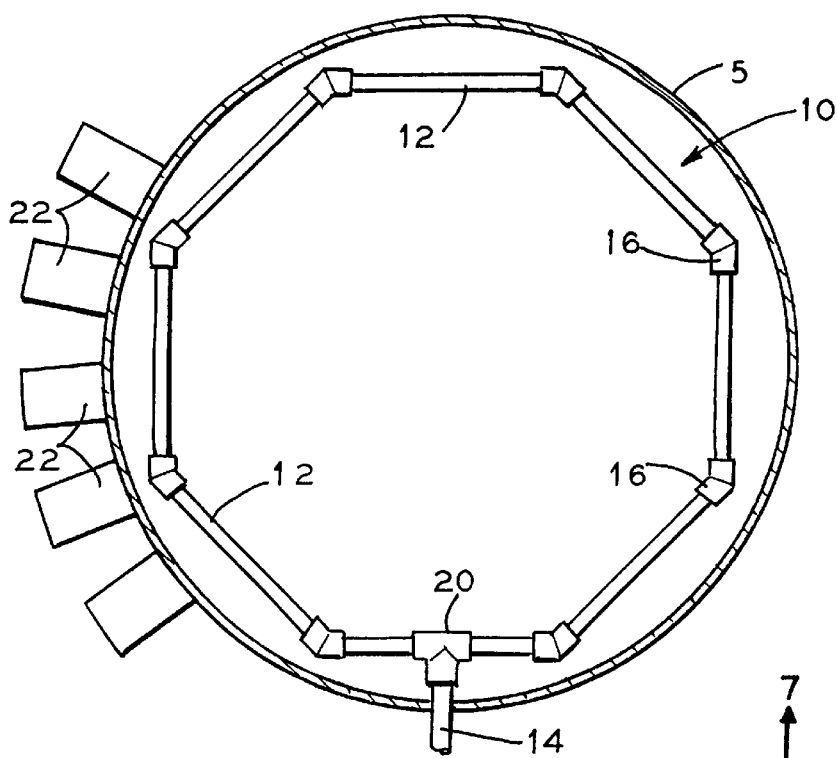
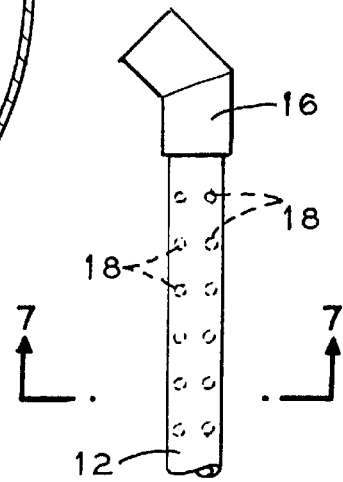
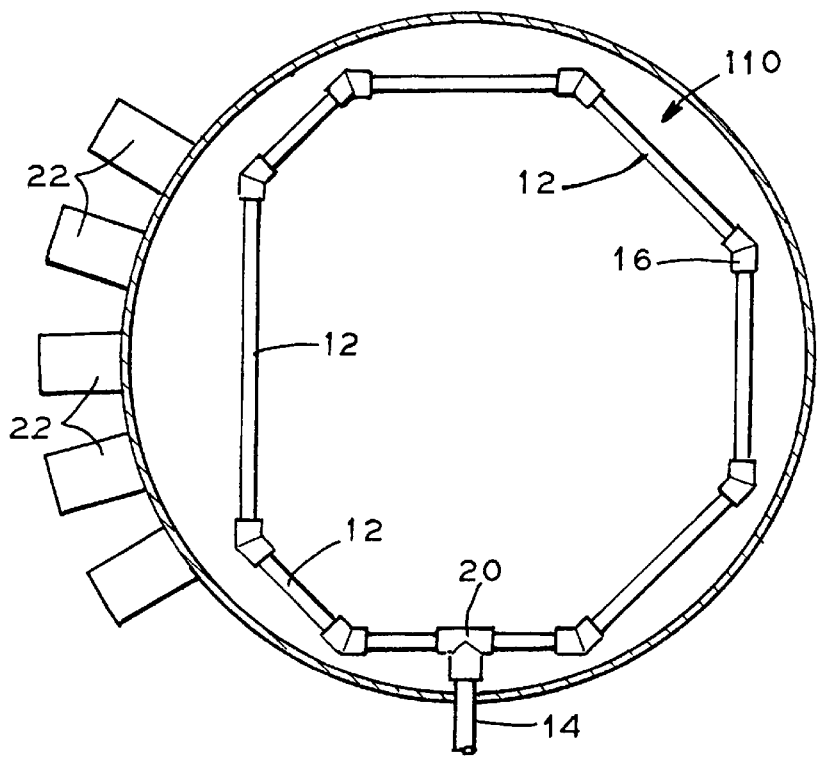
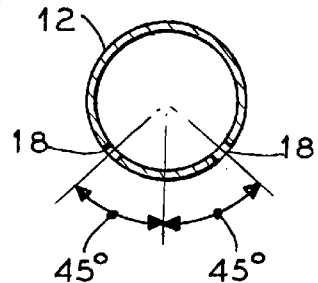

WET SCRUBBER OXIDATION AIR SPARGER ARRANGEMENT

BACKGROUND OF THE INVENTION

1. Field of the Invention

The invention is generally related to the field of wet scrubbing for flue gas desulfurization (FGD) and more particularly to an air sparger assembly for an agitation tank.

2. General Background

Utility and industrial combustion systems, such as power plant boiler combustion chambers, that use high sulfur fuels tend to release sulfur-containing compounds such as sulfur dioxide and sulfur trioxide into the flue gases. Due to the detrimental effects of such compounds, it is necessary to prevent their release into the surrounding environment.

A typical FGD wet scrubber has several spray levels that introduce a slurry with pulverized limestone through spray nozzles. The slurry spray removes the sulfur compounds from the flowing flue gas, forming calcium sulfite. The slurry spray droplets eventually fall onto a liquid level in the lower section of the wet scrubber, which is a tank for recirculating the slurry to the various spray levels. The most economical wet scrubbing process for most electric utility power plants is a limestone forced oxidation chemical process. This process injects air through spargers in the recirculation tank to oxidize the calcium sulfite to calcium sulfate (gypsum). The chemically stable calcium sulfate solids are filtered and dried from a slurry blowdown stream. Also within the tank are several shaft-driven impellers or mixers that agitate the tank to promote mixing and to prevent solids from settling to the bottom of the recirculation tank.

Current oxidation air spargers are designed to uniformly distribute air across the tank. The current air sparger design is characterized by several parallel pipes at a common elevation above the tank floor. There is a minimum height requirement of five to ten feet between the sparger pipe and the mixers in order to avoid mechanical and functional interaction between the two components. This height is dependent on the horsepower of the mixers and increases as the mixer horsepower increases. Each pipe has holes drilled in the lower section of the pipe to discharge air downward. The holes are typically sized to obtain about a one psi air pressure drop at the design air flow. The air flow rate is established by the chemical process objectives and the mass transfer efficiency. At the end of each pipe is a dip leg that is partially filled with slurry to balance the air pressure within the sparger pipe. The parallel sparger pipes are designed to uniformly distribute the air flow across the tank area. The main air flow header that delivers the air from the compressors is typically perpendicular to the parallel sparger pipes within the tank, a common practice for retrofit installations. Alternately, the main air flow header can be located outside the tank with the individual sparger pipes penetrating the recirculation tank, a common practice for new installations. The uniform distribution of air flow inhibits tank mixing by forming many small vortices above each individual sparger pipe. These small vortices are formed by the bubbles moving upward and liquid flow between the spargers moving down. Since the sparger pipes are closely spaced, the downward flow does not penetrate very far below the sparger pipe level. Thus, the sparger pipes tend to isolate the tank into an upper and lower section. The mixer impellers thus must be located below the sparger pipes. An alternate approach for oxidizing and mixing the recirculation tank is to inject the oxidation air via a pipe in the immediate vicinity of a mixer impeller. The impeller and flow of slurry breaks up the air jet into smaller bubbles throughout the tank. Another disadvantage in such systems is that the loss of a mixer affects the capacity of the system to achieve oxidation unless a spare mixer is provided.

SUMMARY OF THE INVENTION

The invention addresses the above needs. What is provided is an air sparger assembly for a flue gas desulfurization wet scrubber agitation tank that eliminates the need for a mixer and reduces the amount of piping required. The air sparge pipes are arranged to be concentric with the agitation tank. A single main header provides air to the air sparge pipes. The discrete location of the air discharge holes in the sparge pipes utilizes the buoyant energy of the oxidation air to mix the slurry in the agitation tank. A circular or octagonal arrangement is used for the air sparge pipes in the preferred embodiment. One side of the sparge pipes may be modified to increase the distance between the oxidation air injection location and the pump recirculation inlets to prevent air entrainment in the pump flow and possibly pump cavitation. Another embodiment of this invention utilizes non-uniformly spaced finger-shaped sparger pipes located between ten to forty inches above the floor of the tank. The spacing between the sparger pipes is also increased beyond what is known in the present art to allow the down flow of the vortices to reach the floor of the tank. The spacing between the sparge pipes is set as a function of the air flow into the tank.

BRIEF DESCRIPTION OF THE DRAWINGS

For a further understanding of the nature and objects of the present invention reference should be made to the following description, taken in conjunction with the accompanying drawing in which like parts are given like reference numerals, and wherein:

FIG. 4 is a top view of the preferred air sparger assembly of the invention.

FIG. 5 is a top view of an alternate embodiment of the invention.

FIG. 6 is an enlarged detail view of one leg and joint of the air sparger assembly of the invention.

FIG. 7 is a view taken along lines 7—7 in FIG. 6.

DETAILED DESCRIPTION OF THE PREFERRED EMBODIMENT

Figure 1:
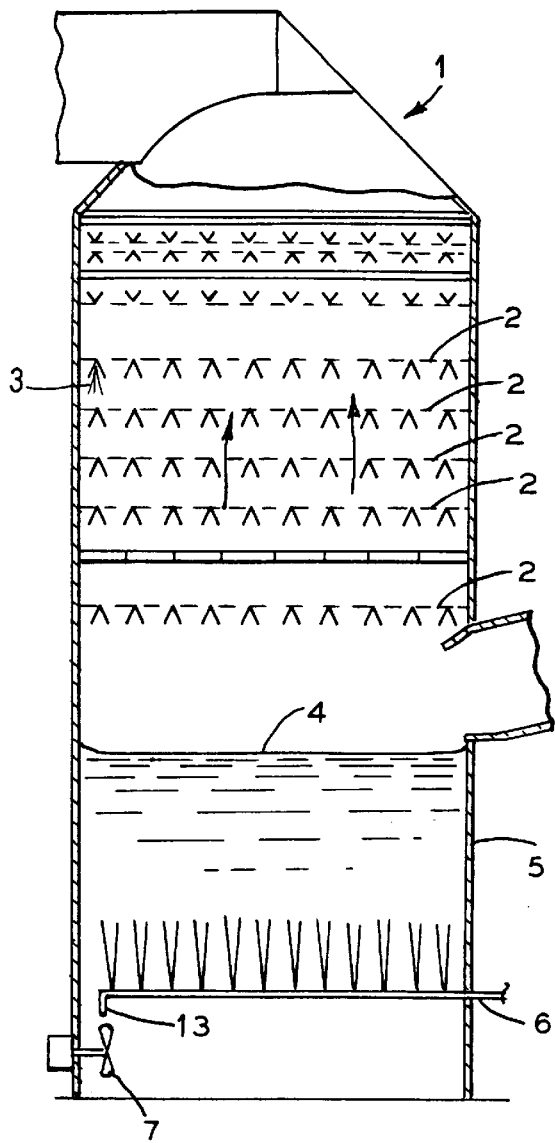
FIG. 1 is a schematic illustration of a typical prior art FGD wet scrubber tower with oxidation air sparger.

As seen in FIG. 1, a typical FGD wet scrubber 1 has several spray levels 2 that introduce a slurry spray 3 downward into the rising gas to remove the sulfur compounds. The pulverized limestone in the slurry spray combines with the sulfur compounds and forms calcium sulfite, which eventually falls into a liquid level 4 in tank 5 for recirculating the slurry to the spray levels 2. A limestone forced oxidation chemical process utilizes an air sparger 6 in the recirculation tank 5 to oxidize the calcium sulfite to calcium sulfate (gypsum). The chemically stable calcium sulfate solids are filtered and dried from a slurry blowdown stream. Also within the tank 5 are one or more impellers or mixers 7 located at minimum elevation from the bottom of the sparge pipes set by the physical dimensions of the mixer blades and the horespower of the mixer motor, the mixers agitate the tank to promote mixing in the area under the sparge pipe.

Figure 2:
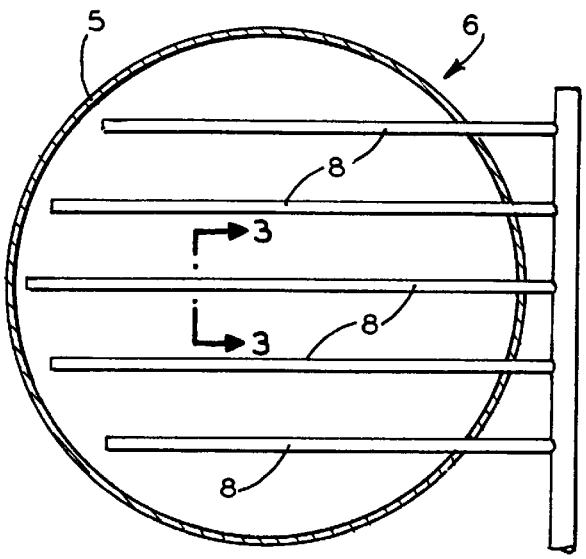
FIG. 2 is a schematic illustration of a typical prior art oxidation air sparger.
Figure 3:
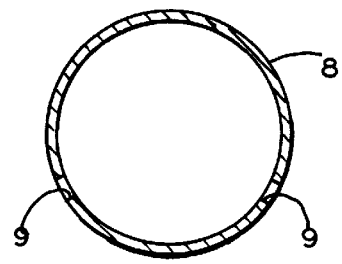
FIG. 3 is view taken along lines 3—3 in FIG. 2.

As illustrated in FIG. 2, the prior art air spargers 6 are designed to uniformly distribute air across the tank 5. Several parallel pipes 8 have holes 9, seen in FIG. 3, on the lower end to discharge air downward. The parallel pipes 8 are connected to air flow header 11, which is typically perpendicular to the pipes 8. At the end of each pipe 8 is a dip leg 13 that is partially filled with slurry to balance the air pressure within the pipe 8.

It is seen in FIG. 4 that the air sparger assembly 10 of the invention is generally comprised of a sparger pipe 12 and header 14.

Sparger pipe 12 is preferably concentric with the tank 5 and positioned at a radius that is 70–95% of the tank radius. Although illustrated as octagonal in shape, with equidistant sides, the sparger pipe 12 may also be circular in shape. In the case of a wet scrubber with a rectangular cross section, the sparger pipe 12 may also be rectangular in shape. Each side of the octagon shape is formed from a straight pipe connected to the adjacent pipes by 45° elbows 16. FIG. 6 is an enlarged view of a section of sparger pipe 12 and one elbow 16. Air holes 18, also seen in FIG. 7, are spaced apart along the length of the sparger pipe 12 and are preferably located to discharge air at a downward angle of up to 45° from straight down, or at least 45° downward from horizontal.

Air is supplied to sparger pipes 12 through a single main header 14 from compressors not shown. Header 14 penetrates the wall of the tank 5 and is in fluid communication with sparger pipes 12 via connector 20.

FIG. 5 illustrates an alternate embodiment of the invention wherein air sparger assembly 110 is modified in the form of a D-shape to increase the distance between the oxidation air injection points and the pump recirculation inlets 22. The straight portion of the D-shaped air shaped sparger pipe is substantially adjacent the pump recirculation inlets 22. This can help to prevent air being entrained in the pump inlets 22, which can cause air entrainment into the pump and significantly reduce the pump performance. A benefit of this embodiment is that the elevation of the sparger assembly 110 may be at or below the elevation of the pump inlets 22.

Figure 8:
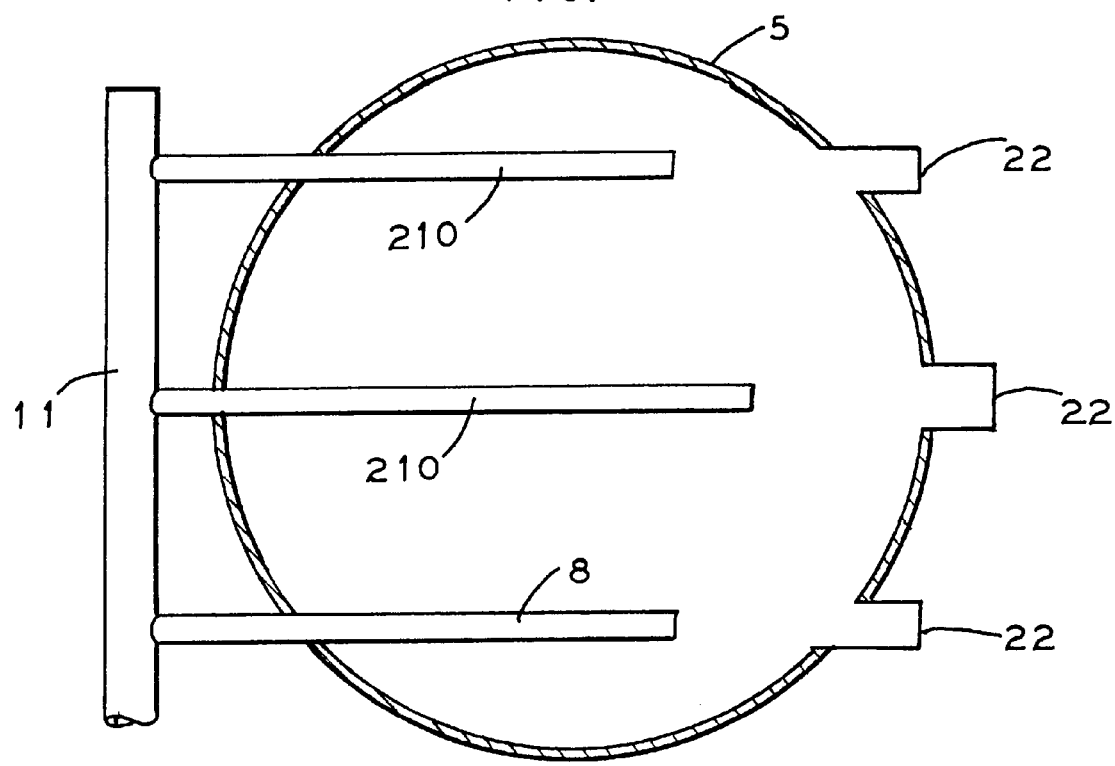
FIG. 8 is a top view of an alternate embodiment of the invention in a round tank.
Figure 9:
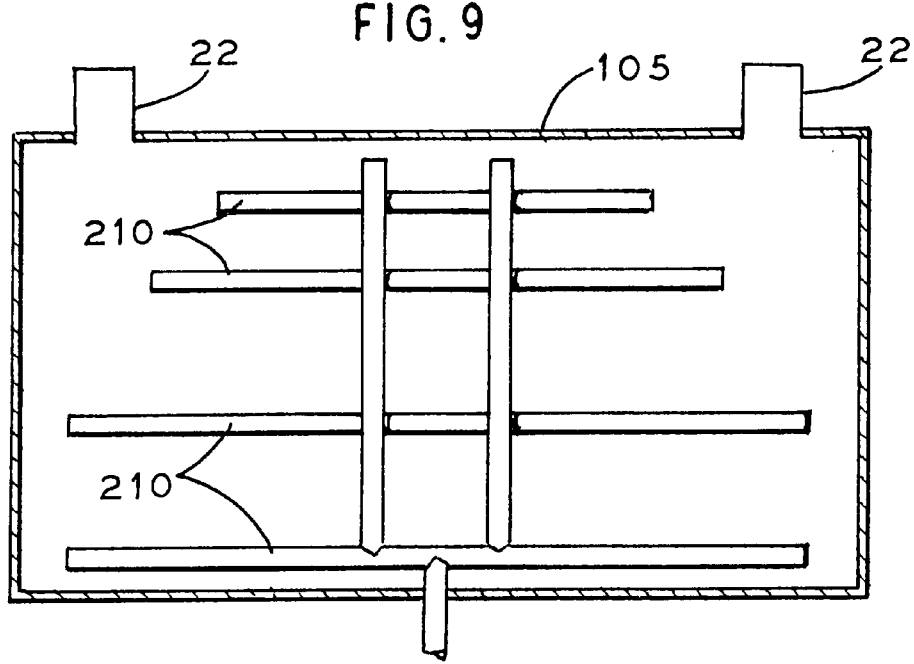
FIG. 9 is a top view of an alternate embodiment of the invention arranged in a rectangular tank.

FIG. 8 and 9 illustrate another alternate embodiment of the invention where air sparge assembly 210 is modified to a non-uniform widely spaced finger arrangement. The assembly 210 is located near the floor of the tank to mix and agitate the contents of the tank 5 and 105. The spacing between the pipes is considerably larger than the traditional state of the art design to allow down flow of the liquid between the characteristic vortex pattern formed. As seen in FIG. 9, the air sparge pipes 210 are of unequal length, do not penetrate the agitation tank, and the shortest of the pipes is nearest the pump recirculation inlets 22.

In operation, the discrete location of air injection points in the tank, as opposed to uniform air injection across the tank in the prior art, eliminates the need for mechanical agitators and thus reduces the wet scrubber capital and operating costs. The arrangement of the air sparger pipes 210 and the air holes as described above effect homogenous suspension in the fluid phase and minimize solids deposition in the agitation tank. Testing has shown that, in the invention, the air discharging into the slurry forms air bubbles that rise upward around the sparger pipe 12 to the recirculation tank liquid level 4. As the air bubbles rise, the liquid slurry is entrained and flows upward with the bubbles. This upward moving liquid flow turns and flows downward in the central portion of the tank and creates a large, toroidal-shaped, mixing vortex. This downward flow of slurry can have sufficient velocity to force some bubbles downward and increase their residence time in the liquid for oxidation.

The invention provides several advantages over the prior art. As mentioned above, the need for mechanical mixers is eliminated. The enhanced mixing permits smaller recirculation tank sizes and improves the oxidation air mass transfer efficiency. The smaller tank sizes are needed for advanced, compact wet scrubbers. Improvements in oxidation air transfer can lower the stoichiometric ratio of air input versus air utilized in the chemical process. Reduced air flow rates represent savings in the FGD system capital and operating costs to compress the air. The sparger pipe arrangement of the invention uses less piping and requires fewer structural supports than prior art designs.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a flue gas desulfurization wet scrubber assembly having a circular agitation tank having a wall, said tank containing fluid and solids and an air sparger assembly in the agitation tank, the improvement comprising:

a. a pump recirculation inlet in the wall of the agitation tank;

b. the air sparger assembly comprising a substantially D-shaped air sparger pipe having a straight portion and a curved portion provided with air holes that are located at least forty-five degrees downward from horizontal to effect homogenous suspension in the fluid phase and to minimize solids deposition in the agitation tank and positioned in the agitation tank so as to be substantially concentric with the agitation tank, the straight portion of the D-shaped air sparger pipe being positioned substantially adjacent said pump recirculation inlet; and c. a single header in fluid communication with said air sparger pipe for providing air to said air sparger pipe.

2. In a flue gas desulfurization wet scrubber assembly having an agitation tank having a wall, said tank containing fluid and solids and an air sparger assembly in the agitation tans, the improvement comprising:

a. a pump recirculation inlet in the wall of the agitation tank;

b. the air sparger assembly comprising an air sparger pipe formed from a plurality of pipes of unequal length that do not penetrate the agitation tank and are unevenly spaced front one another, the shortest of the pipes being nearest said recirculation inlet, with each pipe being provided with air holes that are located at least forty-five degrees downward from horizontal to effect homogenous suspension in the fluid phase and to minimize solids deposition in the agitation tank and positioned in the agitation tank; and b. a single header in fluid communication with said air sparger pipe for providing air to said air sparger pipe.

\* \* \* \* \*